United States Patent [19]

Krolopp et al.

[11] Patent Number: 5,020,091
[45] Date of Patent: May 28, 1991

[54] AUTOMATIC NEW RADIOTELEPHONE SYSTEM REGISTRATION NOTIFICATION

[75] Inventors: Robert K. Krolopp, Lisle; Jeffery L. Mullins, Palatine; Thomas J. Auchter, Barrington, all of Ill.

[73] Assignee: Motorola Inc., Schaumburg, Ill.

[21] Appl. No.: 457,111

[22] Filed: Dec. 26, 1989

[51] Int. Cl.$^5$ ............................................ H04M 11/00
[52] U.S. Cl. ........................................ 379/58; 379/59; 379/60
[58] Field of Search ................ 379/57, 58, 59, 60, 379/62, 63; 455/34, 33

[56] References Cited

U.S. PATENT DOCUMENTS

| | | | |
|---|---|---|---|
| 4,672,657 | 6/1987 | Dershowitz | 379/63 |
| 4,734,928 | 3/1988 | Wener et al. | 379/59 |
| 4,742,560 | 5/1988 | Arai | 455/33 |
| 4,775,999 | 10/1988 | Williams | 379/59 |
| 4,799,253 | 1/1989 | Stern et al. | 379/59 |
| 4,875,230 | 10/1989 | Blair | 379/63 |
| 4,901,340 | 2/1990 | Parker et al. | 379/60 |
| 4,905,301 | 2/1990 | Krolopp et al. | 455/34 |

FOREIGN PATENT DOCUMENTS 0055097 6/1982 European Pat. Off. .
0295678 12/1988 European Pat. Off. .

OTHER PUBLICATIONS

Motorola Dyna TAC 6000X, 1984.

Primary Examiner—Jin F. Ng
Assistant Examiner—William Cumming
Attorney, Agent, or Firm—Kenneth W. Bolvin

[57] ABSTRACT

A process for use in a radiotelephone that has multiple telephone numbers for use in different cellular radiotelephone systems. The numbers are stored in number assignment modules (NAM's) with its corresponding system identification code. The process compares a received system identification code with the ones in memory (103). If a match is found, the radiotelephone user is prompted to select the new telephone number (104). If the new number is not selected or the identification code is not found in memory, the radiotelephone becomes a roaming unit and enters an idle state (107) waiting for an incoming call.

2 Claims, 1 Drawing Sheet

AUTOMATIC NEW RADIOTELEPHONE SYSTEM REGISTRATION NOTIFICATION

FIELD OF THE INVENTION

The present invention relates generally to the field of cellular radiotelephone communications and particularly to cellular radiotelephone registration in a radiotelephone system.

BACKGROUND OF THE INVENTION

A cellular radiotelephone communications system consists of multiple cells covering a geographical area, a metropolitan area for example, each cell consisting of an antenna coupled to a low power transceiver. Each cell has a number of frequencies assigned to it, the frequencies divided into control channels, paging channels, and voice channels. The paging and control channels are used for reciprocal identification between the radiotelephone and the system. The location of the control channels in the cell's frequency spectrum identifies the type of cellular system, A or B (see Electronic Industries Association 553). A metropolitan area typically has one of each type of system.

A cellular radiotelephone operating in a cellular radiotelephone system must identify itself to the system servicing the radiotelephone, allowing the system to interface the radiotelephone to the landline telephone system. The identification typically informs the system that the radiotelephone is active in that particular system in addition to telling the system the telephone number assigned to the radiotelephone. The system informs the radiotelephone of its unique identification code. This identification process, taking place over a paging channel, is accomplished when the radiotelephone is powered up and receiving but not transmitting, in other words, in an idle state.

Autonomous registration is such an identification method (U.S. Pat. No. 4,775,999 to Williams, assigned to Motorola, describes such a registration method). This registration is performed at various time intervals to indicate that the radiotelephone is active in the system. If the radiotelephone moves to another cellular communications system it must register in the new system.

In order for a radiotelephone to register in its home system, it must contain a telephone number assigned to the particular system identification code for that system. If the radiotelephone does not have a number for that system it will still be able to operate in that system but will be considered a roaming radiotelephone and, therefore, typically pay higher rates for using the system.

One solution to this problem has been making radiotelephones with the capability of containing multiple telephone numbers assigned to multiple corresponding system identification codes. If the radiotelephone moves to another system for which the radiotelephone has a telephone number, the user can switch the radiotelephone to that number, thereby paying lower rates. This creates a problem, however, when the radiotelephone has a large number of telephone numbers from which the user can choose. When the radiotelephone travels to another system, the user has to remember the specific telephone number assigned to that particular system. There is a resulting need for a process for informing the radiotelephone user in which system the radiotelephone is located and the telephone number assigned to that system.

SUMMARY OF THE INVENTION

It is an object of this invention to provide a process for informing a radiotelephone user if the radiotelephone has a telephone number assigned to the cellular radiotelephone system in which the radiotelephone is currently located.

The present invention is a process for determining in which system the radiotelephone is located and allowing the user to decide whether that number should be used. The process starts with the radiotelephone scanning the frequencies assigned to the system in which it is located to find the control channels and determine the system identification code. The paging channels are next scanned to find a channel on which to enter the idle state. The received system identification code is then compared with the system identification codes stored in memory in the radiotelephone. Each identification code has a unique telephone number assigned to it for use in that system.

If the received system identification code matches one that is in the radiotelephone's memory, the user is prompted by either the radiotelephone's display or an aural announcement. The user now has the option of switching to that system's number or remaining on the present number and being classified as a roaming radiotelephone.

DETAILED DESCRIPTION OF THE PREFERRED EMBODIMENT

The present invention is a process for automatically determining in which system a radiotelephone is operating and if the radiotelephone has a telephone number that is assigned to that system. The radiotelephone can prompt the user with a display message, an aural prompt or both. This allows a user of a radiotelephone having a large number of telephone numbers to switch to the correct number for the present system without having to remember which number goes with a particular system.

Figure 2:
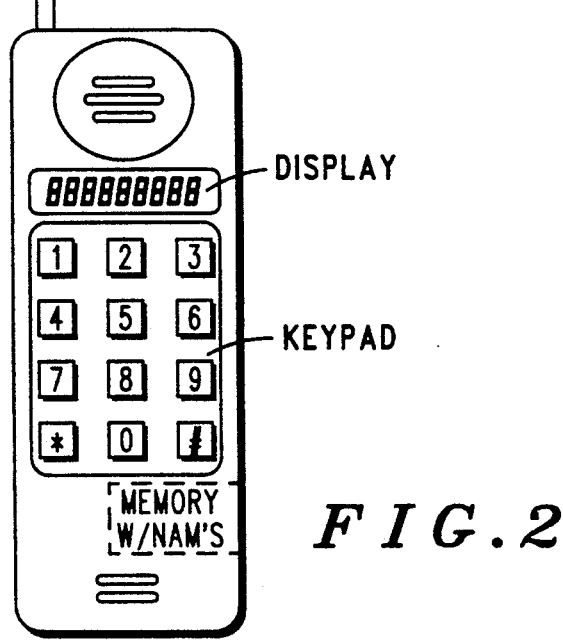
FIG. 2 shows a radiotelephone device.

In a radiotelephone with multiple telephone numbers illustrated in FIG. 2, both the telephone numbers and their corresponding system identification codes are stored in the radiotelephone's memory in number assignment modules (NAM's). The telephone numbers and system identifiers are stored in table form such that once a system identification code is known the telephone number assigned to that system is known.

Figure 1:
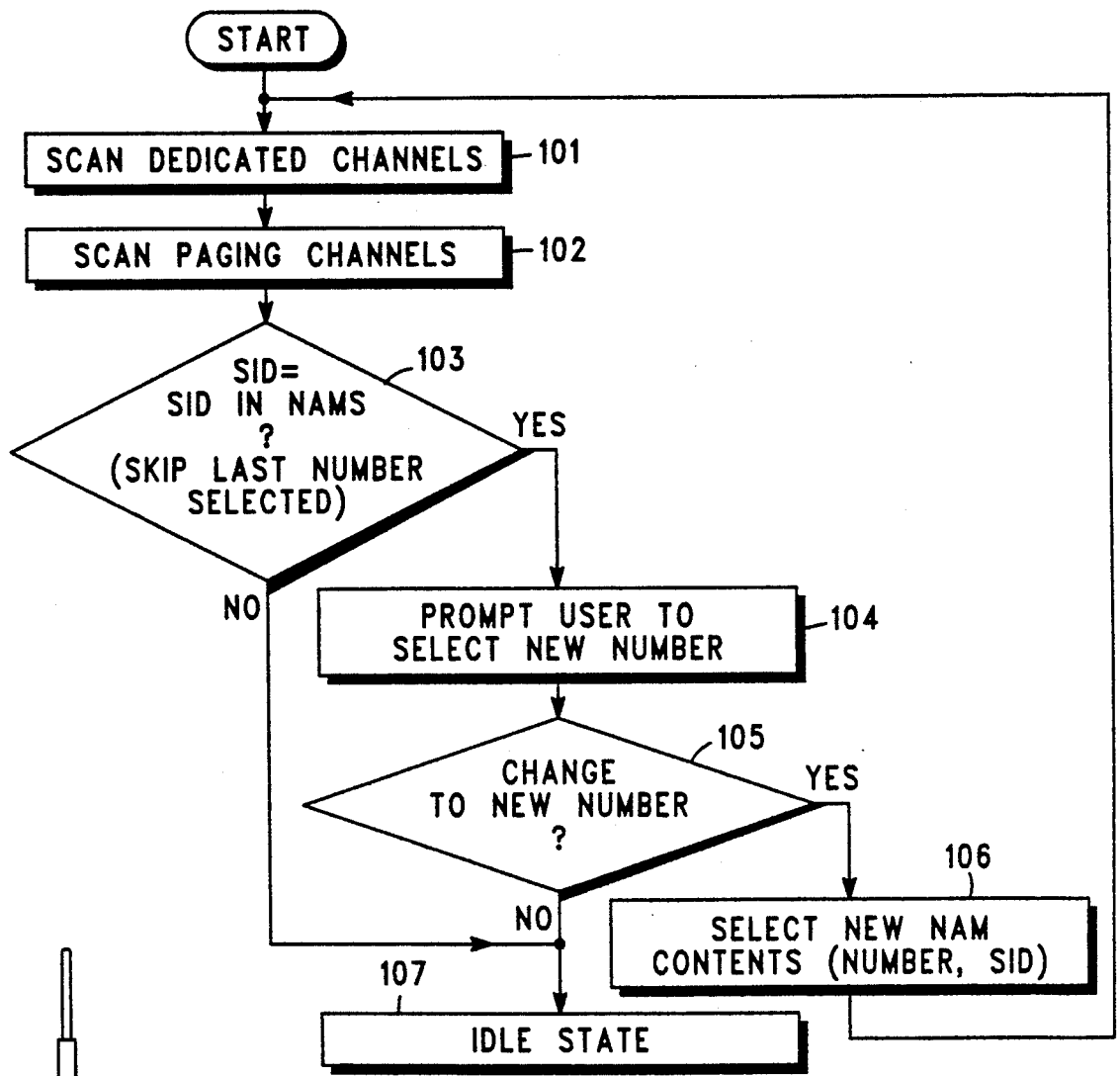
FIG. 1 shows a flow chart of the present invention.

Referring to FIG. 1, the process begins with the radiotelephone scanning a cell's dedicated channels (101) to find the control channels in the cell's frequency spectrum. The paging channels are then scanned (102) to find a channel on which to enter the idle state. These scanning procedures are published in EIA 553. Once the paging channel is found, the radiotelephone receives the identification code assigned to that particular system over the paging channel. The identification code is then compared (103) to the list of system identification codes stored in the radiotelephone.

If the received system identification code matches an identification code stored in the radiotelephone's memory, the user is prompted (104). This prompt, in the preferred embodiment, is a display of the telephone number that is assigned to the system in which the radiotelephone is now operating. In alternate embodiments, the radiotelephone can prompt the user with a display of the system's city name or a combination of the city name and the telephone number. In addition, the radiotelephone can prompt the user aurally with a tone or a voice announcing the telephone number and/or the city name. Any combination of the above prompts may be used without departing from the scope of the present invention.

Once prompted, the user must decide whether to accept the number of the new system or remain on the number of the radiotelephone's home system (105) and roam in the new system. In the preferred embodiment, the user punches a button in the radiotelephone's keypad to make the selection (106). Alternate methods of selecting the number can include other types of switches or voice commands. Once selected, the radiotelephone then begins the process over by scanning for control and paging channels. This time through the telephone number selected from memory is skipped. since the number will not be found during the comparison step (103), instead of prompting the user, the radiotelephone enters an idle state (107) to wait for an incoming call. This idle state (107) is described in EIA 553.

If the received system identification code is not found in the radiotelephone's table, the radiotelephone is considered a roaming unit in that system. This is indicated to the user by a roam indication on the radiotelephone. Once in the roam mode, the radiotelephone enters the idle state (107).

Using the present invention, a radiotelephone with multiple telephone numbers can be used in other cellular systems without requiring the user to memorize or look up which telephone number is used in a particular system. The present invention gives the user an identification of which telephone number to use, allowing the user to choose that number or to remain a roaming unit. If the user remains a roaming unit, parties that will be calling the radiotelephone don't have to be informed of the location of the radiotelephone.

We claim:

1. A method for notification of registration of a radiotelephone device having a display, a keypad, and a memory, the memory having a plurality of telephone numbers and corresponding system identification numbers, the radiotelephone device operating in at least two cellular radiotelephone systems, each cellular radiotelephone system having a unique system identification number and a plurality of frequencies, the pluality of frequencies comprising at least one control frequency and at least one paging frequency, comprising the steps of:

(A) scanning the plurality of frequencies for the at least one control frequency;

(B) scanning the plurality of frequencies for the at least one paging frequency;

(C) receiving the unique system identification number over the at least one paging frequency;

(D) comparing the unique system identification number to the plurality of corresponding system identification numbers;

(E) if the unique system identification number is equal to one of the plurality of corresponding system identification numbers, generating a perceptible indication to a user to allow the user to switch to a system telephone number that is one of the plurality of telephone numbers that corresponds to one of the plurality of corresponding system identification numbers that is equal to the unique system identification number;

(F) if the user switches to the system telephone number, repeating from step A; and (G) waiting for a paging signal, indicating an incoming radiotelephone call, on a frist paging frequency.

2. A method of registration of a radiotelephone device having a display, a keypad, and a memory, the memory having a plurality of telephone numbers and corresponding system identification numbers, the radiotelephone device operating in at least two cellular radiotelephone systems, each cellular radiotelephone system having a unique system identification number and a plurality of radiotelephone frequencies, the plurality of radiotelephone frequencies comprising at least one paging frequency, the steps of the method comprising:

(A) scanning the pluarlity of radiotelephone frequencies;

(B) receiving the unique system identification number over a first radiotelephone frequency of the plurality of radiotelephone frequencies;

(C) comparing the unique system identification number to the plurality of corresponding system identification numbers;

(D) if the unique system identification number is equal to one of the plurality of corresponding system identification numbers, generating a perceptible indication to a user to allow the user to switch to a system telephone number that is one of the plurality of telephone numbers that corresponds to one of the plurality of corresponding system identification numbers that is equal to the unique system identification number;

(E) if the user switches to the system telephone number, repeating from step A; and (F) waiting for a paging signal, indicating an incoming radiotelephone call, on a first paging frequency of the at least one paging frequency.

* * * * *